(12) United States Patent
Kluwe et al.

(10) Patent No.: US 7,787,740 B2
(45) Date of Patent: Aug. 31, 2010

(54) UNIVERSAL CABLE BRACKET

(75) Inventors: Wolf Kluwe, Iserlohn (DE); Marcel G. Mures, Fort Worth, TX (US); Karyne P. Prevratil, Watagua, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/157,622

(22) Filed: Jun. 12, 2008

(65) Prior Publication Data

US 2009/0310928 A1   Dec. 17, 2009

(51) Int. Cl.
G02B 6/00 (2006.01)
G02B 6/44 (2006.01)

(52) U.S. Cl. .................. 385/137; 385/135; 385/136
(58) Field of Classification Search .................. 385/99, 385/137, 136
See application file for complete search history.

(56) References Cited

U.S. PATENT DOCUMENTS

| | | | |
|---|---|---|---|
| 3,906,592 A | 9/1975 | Sakasegawa et al. ........... 24/73 |
| 4,059,872 A | 11/1977 | Delesandri .................... 24/284 |
| 4,285,486 A | 8/1981 | Von Osten et al. ....... 248/316 B |
| 4,354,731 A | 10/1982 | Mouissie ................... 350/96.2 |
| 4,611,875 A | 9/1986 | Clarke et al. ............ 339/154 A |
| 4,645,295 A * | 2/1987 | Pronovost .................... 385/55 |
| 4,752,110 A | 6/1988 | Blanchet et al. ............ 350/96.2 |
| 4,808,774 A | 2/1989 | Crane ......................... 174/135 |
| 4,826,277 A * | 5/1989 | Weber et al. ................ 385/100 |
| 4,865,280 A | 9/1989 | Wollar ....................... 248/68.1 |
| 4,991,928 A | 2/1991 | Zimmer .................... 350/96.2 |
| 5,005,941 A * | 4/1991 | Barlow et al. ............... 385/135 |
| 5,028,114 A | 7/1991 | Krausse et al. ................ 385/78 |
| 5,037,175 A | 8/1991 | Weber .......................... 385/76 |
| 5,048,918 A | 9/1991 | Daems et al. ................. 385/86 |
| 5,125,060 A * | 6/1992 | Edmundson ................ 385/100 |
| 5,157,749 A | 10/1992 | Briggs et al. .................. 385/60 |

(Continued)

FOREIGN PATENT DOCUMENTS

CA         2186314         4/1997

(Continued)

OTHER PUBLICATIONS

Corning Cable Systems, Standard Recommended Procedure, "Universal Strain-Relief," SRP-205-314, Issue 3, Jun. 2001, 1 page.

(Continued)

*Primary Examiner*—Michelle R Connelly Cushwa
(74) *Attorney, Agent, or Firm*—C. Paul Lewallen

(57) ABSTRACT

A universal cable bracket for strain relieving a cable in a fiber management system includes a first portion having a cable receiving area defined therein for holding a section of an optic fiber cable with a notch to prevent postponing; a second portion having a complementary cable receiving area for the section of the optic fiber cable, the second portion being configured to mate with the first portion; a routing window defined in at least one of the first and second portions for routing a fiber of the optic fiber cable therethrough; and a sacrament assembly being configured to hold the first and second portions together and to secure the section of the optic fiber cable there between.

21 Claims, 6 Drawing Sheets

U.S. PATENT DOCUMENTS

| | | | | |
|---|---|---|---|---|
| 5,224,186 | A | 6/1993 | Kishimoto et al. | 385/78 |
| 5,231,688 | A | 7/1993 | Zimmer | 385/139 |
| 5,239,609 | A | 8/1993 | Auteri | 385/136 |
| 5,261,633 | A | 11/1993 | Mastro | 248/74.1 |
| 5,280,138 | A | 1/1994 | Preston et al. | 174/152 G |
| 5,347,603 | A | 9/1994 | Belenkiy et al. | 385/86 |
| 5,373,421 | A | 12/1994 | Detsikas et al. | 361/810 |
| 5,443,232 | A | 8/1995 | Kesinger et al. | 248/62 |
| 5,458,019 | A | 10/1995 | Trevino | 74/502.4 |
| 5,471,555 | A * | 11/1995 | Braga et al. | 385/136 |
| 5,481,634 | A | 1/1996 | Anderson et al. | 385/76 |
| 5,481,939 | A | 1/1996 | Bernardini | 74/502.4 |
| 5,638,474 | A | 6/1997 | Lampert et al. | 385/78 |
| 5,640,476 | A | 6/1997 | Womack et al. | 385/86 |
| 5,710,851 | A | 1/1998 | Walter et al. | 385/86 |
| 5,742,982 | A | 4/1998 | Dodd et al. | 24/16 R |
| 5,751,874 | A | 5/1998 | Chudoba et al. | 385/72 |
| 5,778,122 | A | 7/1998 | Giebel et al. | 385/55 |
| 5,793,920 | A | 8/1998 | Wilkins et al. | 385/135 |
| 5,887,095 | A | 3/1999 | Nagase | 385/58 |
| 5,903,693 | A | 5/1999 | Brown | 385/100 |
| 5,915,055 | A * | 6/1999 | Bennett et al. | 385/59 |
| 5,923,804 | A | 7/1999 | Rosson | 385/51 |
| 5,993,071 | A | 11/1999 | Hultermans | 385/70 |
| 6,134,370 | A | 10/2000 | Childers et al. | 385/135 |
| 6,149,313 | A | 11/2000 | Giebel et al. | 385/60 |
| 6,151,432 | A | 11/2000 | Nakajima et al. | 385/78 |
| 6,201,920 | B1 | 3/2001 | Noble et al. | 385/134 |
| 6,234,683 | B1 | 5/2001 | Waldron et al. | 385/78 |
| 6,234,685 | B1 | 5/2001 | Carlisle et al. | 385/83 |
| 6,389,214 | B1 | 5/2002 | Smith et al. | 385/136 |
| 6,533,472 | B1 | 3/2003 | Dinh et al. | 385/95 |
| 6,571,048 | B1 * | 5/2003 | Bechamps et al. | 385/136 |
| 6,579,014 | B2 | 6/2003 | Melton et al. | 385/76 |
| 6,648,520 | B2 | 11/2003 | McDonald et al. | 385/78 |
| 6,868,216 | B1 | 3/2005 | Gehrke | 385/134 |
| 6,985,665 | B2 * | 1/2006 | Baechtle | 385/136 |
| 7,035,510 | B2 | 4/2006 | Zimmel et al. | 385/100 |
| 7,090,406 | B2 | 8/2006 | Melton et al. | 385/62 |
| 7,090,407 | B2 | 8/2006 | Melton et al. | 385/62 |
| 7,111,990 | B2 | 9/2006 | Melton et al. | 385/53 |
| 7,113,679 | B2 | 9/2006 | Melton et al. | 385/113 |
| 7,128,471 | B2 * | 10/2006 | Wilson | 385/78 |
| 7,200,316 | B2 | 4/2007 | Giraud et al. | 385/135 |
| 7,270,485 | B1 * | 9/2007 | Robinson et al. | 385/55 |
| 7,330,629 | B2 | 2/2008 | Cooke et al. | 385/136 |
| 7,461,981 | B2 * | 12/2008 | Yow et al. | 385/76 |
| 2002/0064364 | A1 * | 5/2002 | Battey et al. | 385/136 |
| 2002/0141724 | A1 * | 10/2002 | Ogawa et al. | 385/137 |
| 2003/0007743 | A1 | 1/2003 | Asada | 385/81 |
| 2003/0147604 | A1 * | 8/2003 | Tapia et al. | 385/101 |
| 2004/0086238 | A1 * | 5/2004 | Finona et al. | 385/86 |
| 2005/0254757 | A1 | 11/2005 | Ferretti, III et al. | 385/88 |

FOREIGN PATENT DOCUMENTS

| | | |
|---|---|---|
| DE | 3726718 A1 | 2/1989 |
| DE | 3726719 A1 | 2/1989 |
| DE | 4231181 C1 | 8/1993 |
| DE | 10338848 A1 | 3/2005 |
| DE | 202005009932 | 12/2005 |
| EP | 0250900 | 1/1988 |
| EP | 0468671 | 7/1990 |
| EP | 0547778 | 12/1991 |
| EP | 0940700 | 2/1993 |
| EP | 0581527 | 2/1994 |
| EP | 0693699 B1 | 1/1996 |
| EP | 0949522 | 4/1998 |
| EP | 1065542 | 6/1999 |
| WO | WO93/26070 | 12/1993 |
| WO | WO97/12268 | 4/1997 |
| WO | WO01/27660 | 4/2001 |

OTHER PUBLICATIONS

Corning Cable Systems, Standard Recommended Procedure, "Strain-Relief Bracket Kit (HD2-BKT-KIT)," SRP-003-442, Issue 3, Nov. 2000, 2 pages.

Siecor, Siecor Recommended Procedure, "Bridge Strain Relief," SRP-203-211, Issue 2, Jul. 1998, 1 page.

Corning Cable Systems, Standard Recommended Procedure, "Universal Strain-Relief Bracket," SRP-000-203, Issue 3, Apr. 2001, 1 page.

Corning Cable Systems, Standard Recommended Procedure, "Installation of Cable Strain Relief Hardware," SRP-003-239, Issue 3, Mar. 2001, 1 page.

Corning Cable Systems LLC, Instruction, "Bridge Strain Relief," 203-207, Issue 5, Mar. 2001, 1 page.

Corning Cable Systems, Standard Recommended Procedure, "WCH/UCC Strain-Relief Bracket Kit," SRP-003-443, Issue 3, Oct. 2000m 2 pages.

European Patent Office, European Search Report for EP Patent Application No. 09007475.8, Sep. 16, 2009, 6 pages.

* cited by examiner

UNIVERSAL CABLE BRACKET

BACKGROUND OF THE INVENTION

1. Field of the Invention

The present invention relates generally to cable brackets for a fiber optic cable, and more particularly to a cable bracket that provides strain relief to a fiber optic cable installed in a fiber optic cable management system.

2. Technical Background

Fiber optic cable management systems are used to provide service to an individual subscriber's site from a central office, headend, or remote terminal serving numerous subscribers. The fiber optic cable may be installed in the terminal using splice trays to terminate fiber pigtails for connectivity. The fiber optic cables may typically be constructed with strength members and a cable sheath for protection and support.

To prevent central strength members of the fiber optic cable from pistoning or bowing, as well as to prevent cable sheath slippage, strain-relief brackets and hose clamps are commonly used to strain relieve the fiber optic cable at the terminal. However, depending on whether the fiber optic cable is round or flat, different types of strain-relief brackets, clamps and/or fasteners are required to secure the fiber optic cable at the terminal. The different brackets, clamps and fasteners also, unfortunately, require different tools, such as various types of screw drivers, which a technician must carry in the field in addition to other supplies.

What is needed in the industry are devices and methods for quickly preparing and terminating a fiber optic cable at a terminal without requiring different types of clamps, fasteners and tools.

BRIEF SUMMARY OF THE INVENTION

The present disclosure is directed to devices and methods for quickly and easily preparing and connecting a fiber optic cable at a terminal. The component parts described herein are economical and simple to manufacture and use.

One embodiment of the present disclosure is directed to a universal cable bracket for strain relieving a cable in a fiber management system. The bracket may include a first portion having a cable receiving area defined therein for holding a section of an optic fiber cable, which may be flat or round. The bracket may further include a second portion having a complementary cable receiving area for the section of the optic fiber cable, the second portion being configured to mate with the first portion; a routing window defined in at least one of the first and second portions for routing a fiber of the optic fiber cable therethrough; and a securement assembly being configured to hold the first and second portions together and to secure the section of the optic fiber cable therebetween.

In this embodiment, a strength or central member may be located in the optic fiber cable to provide strength or rigidity, depending on the type of cable. Further, the cable receiving areas may each include a notch configured to hold the member to prevent axial movement of the optic fiber cable.

The first portion and the second portion each may have at least one pin and one receptacle. The pins may extend in a direction away from respective cable receiving areas. The receptacles may be formed near the respective cable receiving areas with respective pins of each portion being configured to press fit in respective receptacles of the other portion. The first portion, the second portion or both may include a slot, and the securement assembly may include a sliding clamp for insertion through the slot to contact optic fiber cable. In this example, the sliding clamp has a blade configured to grip the optic fiber cable.

The securement assembly may also include a receptacle for receiving a securement device. The securement device may be configured for seating in the receptacle to hold the first portion and the second portion together.

This embodiment may further include at least one projection depending from proximate the cable receiving areas. The projection may be configured for connecting the universal cable bracket to a terminal end cap.

In another embodiment of the disclosure, a universal cable bracket for strain relieving a cable in a fiber management system may include a first bracket portion having a first slot defined therethrough and a first cable receiving area defined therein, the first cable receiving area being configured to receive a central member of an optic fiber cable to prevent axial movement of the optic fiber cable; a second bracket portion having a second cable receiving area for the section of the optic fiber cable, the second bracket portion being configured to mate with the first bracket portion; a routing window defined in at least one of the first and second bracket portions for routing a fiber of the optic fiber cable therethrough; a first clamp being configured to slide through the first slot to grip the optic fiber cable; and a second clamp being configured to slide through the second slot to grip the optic fiber cable.

In this embodiment, the first bracket portion and the second bracket portion may each have respective pins and receptacles that are configured to press fit or snap fit together.

Also in this embodiment of the universal cable bracket, a projection may be included, which is configured for connecting the universal cable bracket to a terminal end cap. The projection may extend from a finger, which itself extends from proximate the first and second cable receiving areas. The exemplary finger has a spring constant to urge the projection into connection with the terminal end cap.

In a further embodiment according to the disclosure, a method of installing a universal cable bracket about a cable in a fiber management system to strain relieve the cable may include placing a central member of an optic fiber cable in a cable receiving area of a first portion to restrain axial movement of the optic fiber cable and positioning a complementary second portion proximate the first portion. One or more fiber tubes of the optic fiber cable may be routed through a routing window of one of the first and second portions; and the first portion and the second portion may be connected together.

In addition to other features and aspects, the method may further include attaching a securement device about the first and second portions. The securement device may be a plastic cable tie or a metal clamp.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure and are incorporated into and constitute a part of this specification. The drawings illustrate various embodiments of the disclosure and together with the description serve to explain the principals and operations of the disclosure.

BRIEF DESCRIPTION OF THE DRAWINGS

The foregoing and other features, aspects and advantages of the present disclosure may be better understood when the following detailed description is read with reference to the accompanying drawings, in which.

DETAILED DESCRIPTION OF THE DISCLOSURE

Figure 1:
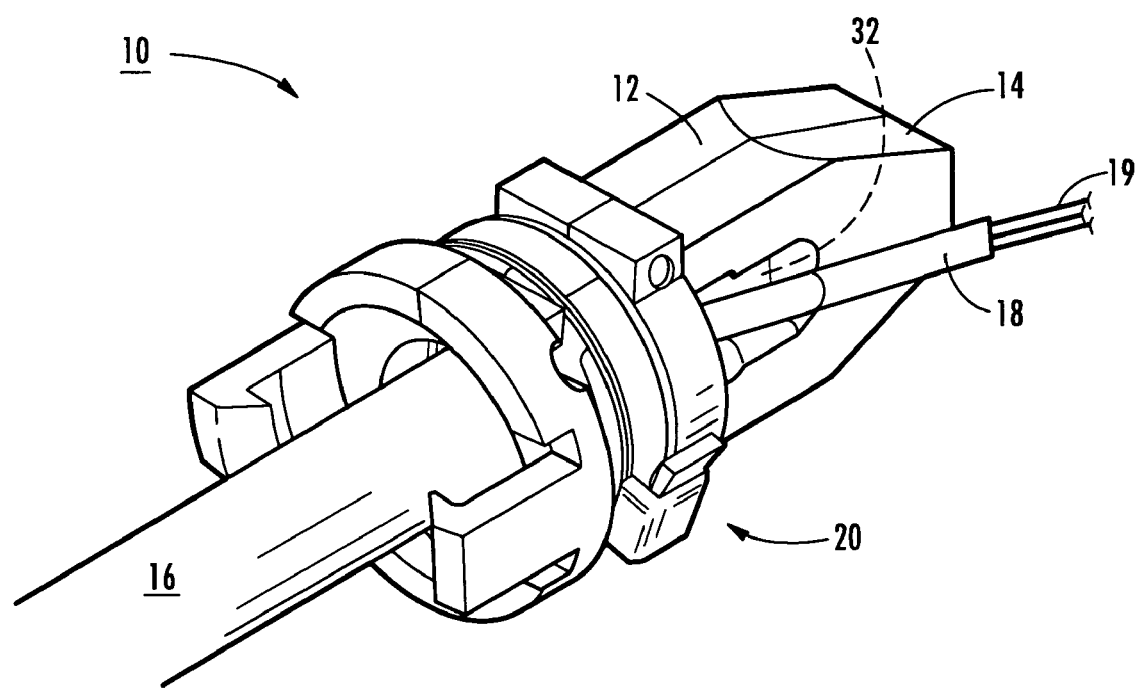
FIG. 1 is a perspective view of a universal cable bracket according to an embodiment of the present disclosure.

The present disclosure will now be described more fully hereinafter with reference to the accompanying drawings in which exemplary embodiments of the disclosure are shown. However, aspects of this disclosure may be embodied in many different forms and should not be construed as limited to the embodiments set forth herein. These exemplary embodiments are provided so that this disclosure will be both thorough and complete, and will fully convey the scope of the disclosure to those skilled in the art. Whenever possible, like reference numerals will be used throughout the detailed description of the disclosure to refer to like or similar elements of the various drawings.

The present disclosure generally provides various embodiments of a universal cable bracket to prevent fiber optic cables from pistoning, i.e., from moving axially, and to strain relieve the fiber optic cables. The various embodiments are made from lightweight, economical materials and components that are simple to manufacture and are easily used in the field by a technician.

With reference to FIG. 1, a universal cable bracket or strain relief bracket is designated in general by the reference numeral 10. As shown, the strain relief bracket 10 includes two portions or bracket halves 12, 14 (also referred to as clam shells) for use with a fiber optic cable 16. The bracket halves 12, 14 have a slot or routing window 32 through which one or more buffer tubes 18 and one or more optic fibers 19 contained therein extend for splicing inside a terminal. For instance, the fibers 19 may be fusion spliced at a Sealed Small Dome Fiber Terminal available from Corning Cable Systems to provide service to an individual subscriber. In this example, the two bracket halves 12, 14 are secured about the cable 16 by a securement device such as a metal clamp or plastic cable tie 20 to prevent axial movement of the cable 16 and to provide strain relief at the terminal. This embodiment and others and equivalents may be better understood from the following discussion and by practice of the disclosure.

Figure 2:
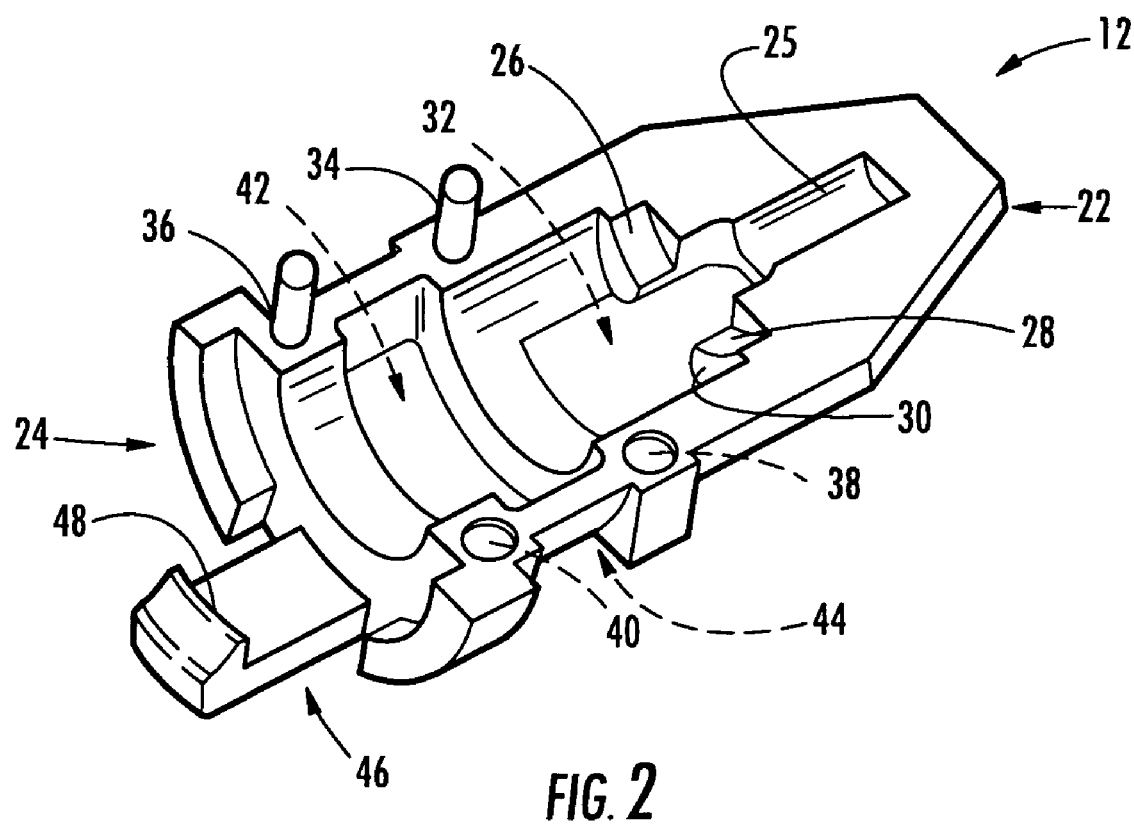
FIG. 2 is a perspective view of a portion of the universal cable bracket as in FIG. 1.

FIG. 2 most clearly shows the bracket half 12, which is substantially similar to its counterpart bracket half 14. For brevity, reference numerals that are used to identify the following components and aspects of the bracket half 12 may apply to the bracket half 14 unless indicated otherwise. It will be understood by those skilled in the art that the disclosure is not limited to only two bracket halves 12, 14 nor must the bracket halves 12, 14 be identical. For instance, three or more components similar to bracket halves 12, 14 may be used to accommodate different cable requirements under different field conditions.

With continued reference to FIG. 2, the bracket half 12 has a first end 22 and a second end 24. As shown, the first end 22 includes various cable receiving areas to hold portions or sections of the cable 16. For instance, a blocking cradle or notch 25 is provided to cradle and immobilize a strength member or a central member, in this case, a round cable central member 60 (see, e.g., FIG. 3). Likewise, a set of shoulders 26, 28 is formed in the bracket half 12 to secure and position two lateral strength members of a flat cable (not shown), and a slot 30 is provided to position a round cable such as the cable 16 shown in FIG. 1. As briefly introduced above, the buffer tube 18 will extend through the routing window 32 to continue within the terminal for fusion splicing.

FIG. 2 further shows that the second end 24 includes various attachment features such as exemplary cylindrically-shaped alignment pins 34, 36 and alignment pin receptacles 38, 40. As noted above, the bracket half 14 will include complementary alignment pins and receptacles that are disposed on opposite sides of those shown in FIG. 2. Thus; the alignment pins 34, 36 of the bracket half 12 would extend into and be seated within complementary receptacles 38, 40 of the opposing bracket half 14. In this example, the alignment pins 34, 36 will have slightly larger circumferences than the receptacles 38, 40 of the opposing bracket half 14 in order to provide a press fit or snap fit action to secure the bracket half 12 to the bracket half 14. Those skilled in the art will understand that the exemplary pins 34, 36 and opposing receptacles 38, 40 are but one way to secure the bracket halves 12, 14 together and the disclosure is not limited to this example. For instance, the pins 34, 36 and receptacles 38, 40 may be substituted with or also include screw assemblies. Additionally, or alternatively, these components can be replaced with sliding components.

Also shown in FIG. 2, a sliding clamp slot 42 is provided to receive a sliding clamp 50, 52, which will be described with respect to FIGS. 3 and 4 below. Also described below, an indentation or tie receptacle 44 is shown in FIG. 2 to secure a cable tie 20 about the bracket halves 12, 14. Finally, a snap or finger 46 is shown with a projection or hook 48 for engaging a terminal end cap that will be discussed with respect to FIG. 6 below.

Figure 3:
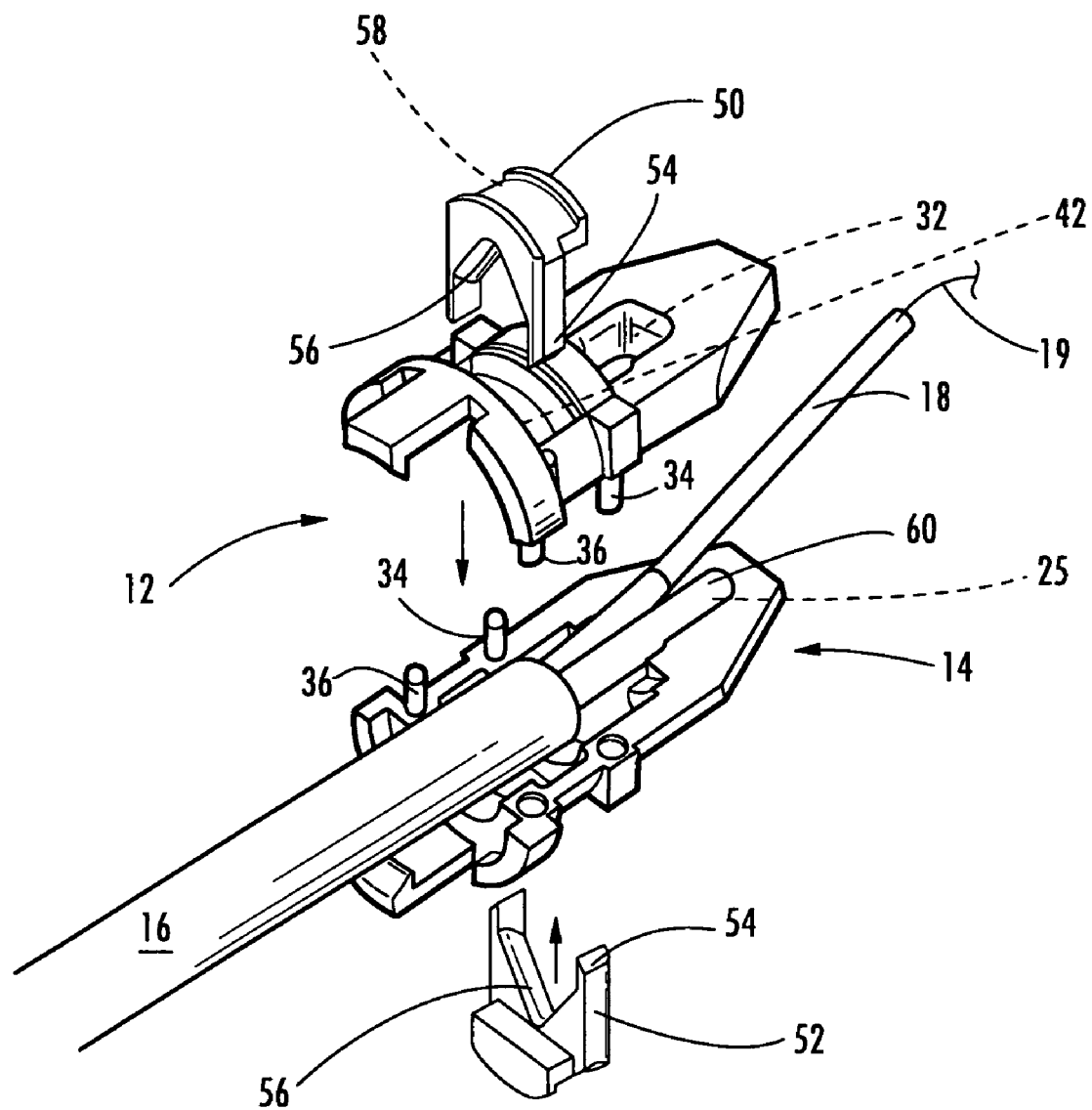
FIG. 3 is an exploded perspective view of the universal cable bracket as in FIG. 1 being employed about the fiber optic cable.
Figure 4:
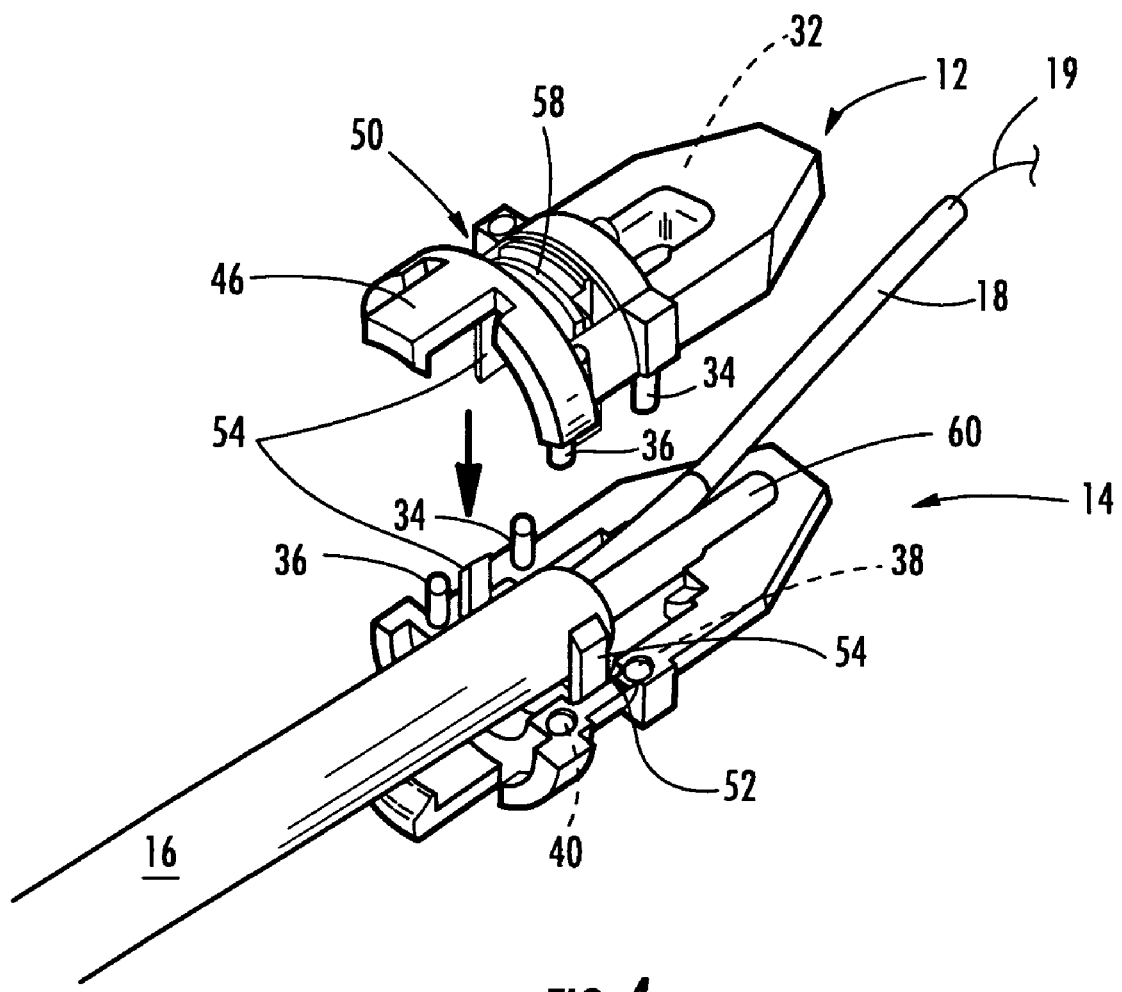
FIG. 4 is a perspective view similar to FIG. 3, particularly showing sliding clamps being inserted in slots.

FIGS. 3 and 4 show a process of installing the strain relief bracket 10 about the cable 16. In FIG. 3, an outer jacket of the cable 16 is stripped to expose the buffer tube 18 and the central member 60 briefly introduced above. The central member 60 may be a fiberglass rod to add rigidity to the cable 16 to prevent violating a minimum bend radius of the optic fiber 19 (only one is shown for clarity) embedded within the cable 16. As shown, the central member 60 is nested in the blocking notch 25 to prevent pistoning of the central member 60. The buffer tube 18 is extended upward in this example to be extended through the routing window 32. The bracket half 12 is placed over the cable 16 and the pins 34, 36 and complementary receptacles 38, 40 of the two halves 12, 14 are aligned and snapped together as discussed above. Although the tube 18 is shown and described as being routed through the routing window 32 of the first bracket half 12, it will be understood that the process is applicable as well to the bracket half 14.

FIG. 3 particularly shows a securement assembly, which included the sliding clamps 50, 52 being inserted through respective sliding clamp slots 42 of the two halves 12, 14. As shown, the sliding clamps 50, 52 each have guide posts 54 that slide about the cable 16. Moreover, the sliding clamps 50, 52 may each have blades or cradles 56 which are, in this example, v-shaped blades that grip the cable 16 once the sliding clamps 50, 52 and the bracket halves 12, 14 are snapped together.

Turning again to FIG. 4, the sliding clamps 50, 52 are shown inserted in their respective sliding clamp slots 42 of the halves 12, 14. As shown, the guide posts 54 project around the cable 16 as introduced above.

Figure 5:
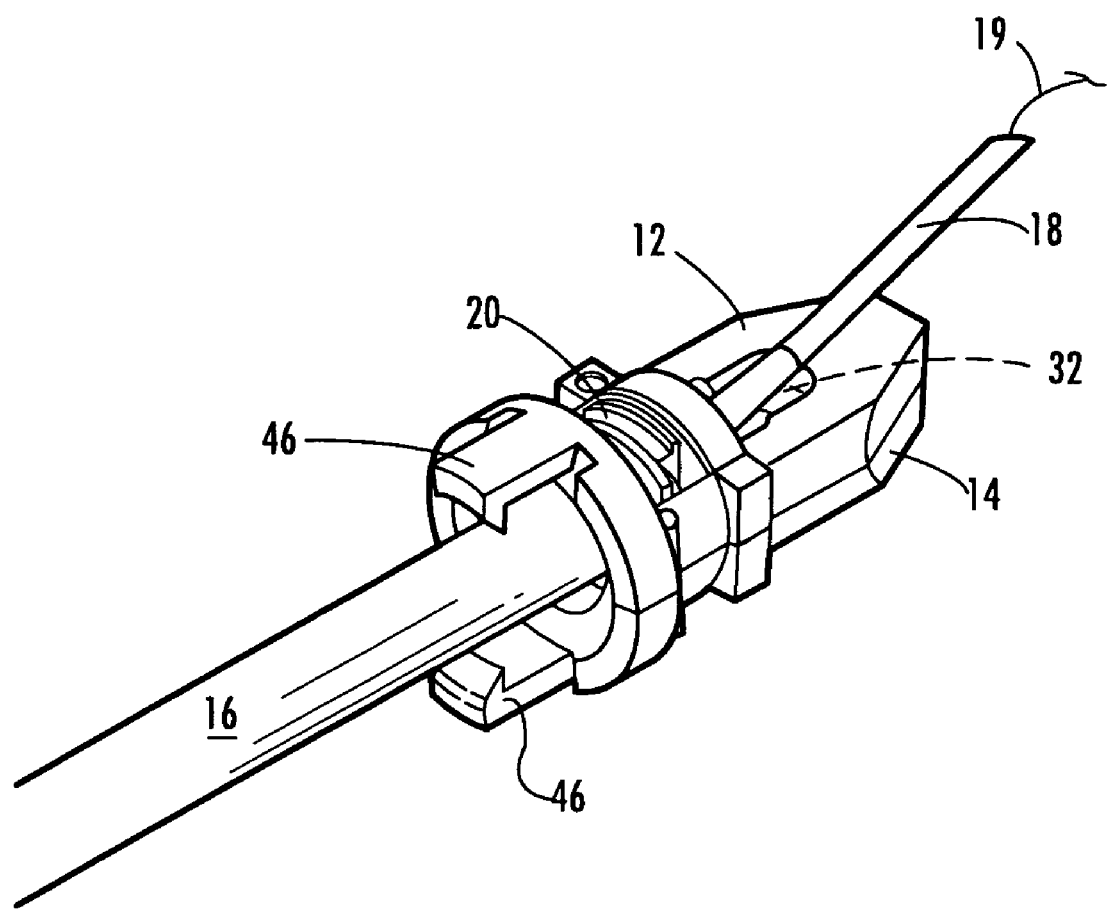
FIG. 5 is the universal cable bracket in position about the fiber optic cable as in FIG. 1.

With reference to FIGS. 3-5, the bracket halves 12, 14 have been snapped together, and the sliding clamps 50, 52 have been slid through the sliding clamp slots 42 of the respective halves 12, 14. The buffer tube 18 has been extending through one of the routing windows 32 for termination or fusion elsewhere as noted above. As shown, the securement assembly further includes respective tie receptacles 58 formed in the sliding clamps 50, 52, and the assembly is completed by securing the cable tie or clamp 20 (metal or plastic) about the tie receptacle 44 and tie receptacles 58 as shown in FIG. 1. Accordingly, the cable tie 20 binds the strain relief bracket 10 about the cable 16 to prevent axial movement and to provide strain relief as introduced above. FIG. 5 further shows that the snap fingers 46 are spaced away from the cable 16 for connection to a terminal end cap 62 discussed below.

Figure 6:
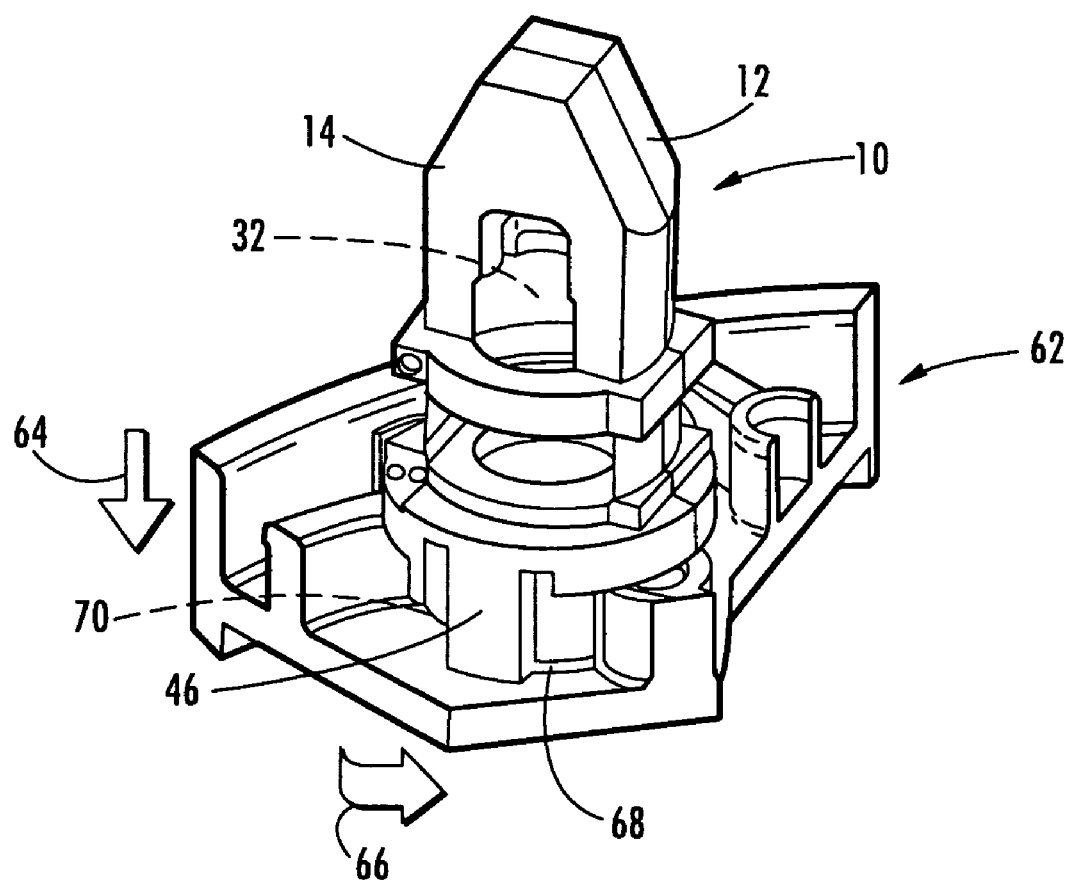
FIG. 6 is a perspective view of the universal cable bracket attached to a terminal end cap according to an aspect of the present disclosure.

FIG. 6 shows the strain relief bracket 10 without the cable 16 or its buffer tube 18 for clarity. As shown, the bracket halves 12, 14 are connected to the terminal end cap 62 by compressive and twisting actions 64, 66 of the snap fingers 46 of each of the halves 12, 14. More specifically, the terminal end cap 62 may include a receptacle ledge 68 under which each of the projections 48 of each of the snap fingers 46 engage. For example, the projections 48 of the snap fingers 46 may slip into a notch 70 and the twisting action 66 slides the projections 48 under the ledge 68 to secure the strain relief bracket 10 to the terminal end cap 62. Additionally or alternatively, the snap fingers 46 may have a spring constant that may be temporarily overcome by the compressive action 64 to push the snap finger 46 radially outward until the projections 48 pass the ledge 64 and snap under it at which time the spring constant of the snap fingers 46 urge the snap fingers 46 into their original axial orientation, thus causing the projections 48 to hook under the ledge 64. Alternatively, the bracket halves 12, 14 may be connected to the terminal end cap 62 by a threaded attachment.

The foregoing is a description of various embodiments of the disclosure that are provided here by way of example only. Although the strain relief brackets have been described with reference to the presently preferred embodiments and examples thereof, other embodiments and examples may perform similar functions and/or achieve similar results in the field. All such equivalent embodiments and examples are within the spirit and scope of the present disclosure and are intended to be covered by the appended claims and their equivalents. Moreover, although specific terms are employed herein, they are used in a generic and descriptive sense only and are not for purposes of limitation.

That which is claimed is:

1. A universal cable bracket for strain relieving a cable in a fiber management system, the bracket comprising:
   a first portion having a cable receiving area defined therein for holding a section of an optic fiber cable;
   a second portion having a complementary cable receiving area for the section of the optic fiber cable, the second portion being configured to mate with the first portion;
   a routing window defined in at least one of the first and second portions for routing a fiber tube of the optic fiber cable therethrough;
   a securement assembly being configured to hold the first and second portions together and to secure the section of the optic fiber cable there between; and
   a member disposed in the optic fiber cable to provide strength;
   wherein the cable receiving areas each define a notch, each notch being configured to hold the member to prevent axial movement of the optic fiber cable.

2. The universal cable bracket as in claim 1, wherein the optic fiber cable is flat or round.

3. The universal cable bracket as in claim 1, wherein the first portion and the second portion each have at least one pin and one receptacle, the pins depending in a direction away from respective cable receiving areas, the receptacles being formed proximate the respective cable receiving areas, respective pins of each portion being configured to press fit in respective receptacles of the other portion.

4. The universal cable bracket as in claim 1, wherein at least one of the first portion and the second portion includes a slot defined therethrough and the sacrament assembly includes a sliding clamp for insertion through the slot to contact optic fiber cable.

5. The universal cable bracket as in claim 4, wherein the sliding clamp has a blade being configured to grip the optic fiber cable.

6. The universal cable bracket as in claim 4, wherein the sacrament assembly further includes a receptacle for receiving a sacrament device, the sacrament device being configured for seating in the receptacle to hold the first portion and the second portion together.

7. The universal cable bracket as in claim 1, further comprising at least one projection depending from proximate the cable receiving areas, the projection being configured for connecting the universal cable bracket to a terminal end cap.

8. A universal cable bracket for strain relieving a cable in a fiber management system, the bracket comprising:
   a first bracket portion having a first slot defined therethrough and a first cable receiving area defined therein, the first cable receiving area being configured to receive a strength member of an optic fiber cable to prevent axial movement of the optic fiber cable;
   a second bracket portion having a second slot defined therethrough and a second cable receiving area for a section of the optic fiber cable, the second bracket portion being configured to mate with the first bracket portion;
   a routing window defined in at least one of the first and second bracket portions for routing a fiber tube of the optic fiber cable therethrough;
   a first clamp being configured to slide through the first slot to grip the optic fiber cable; and
   a second clamp being configured to slide through the second slot to grip the optic fiber cable;
   wherein the first cable receiving area defines a notch, the notch being configured to hold the strength member to prevent axial movement of the optic fiber cable.

9. The universal cable bracket as in claim 8, wherein the optic fiber cable is flat or round.

10. The universal cable bracket as in claim 8, wherein the first bracket portion and the second bracket portion each have respective pins and receptacles being configured to press fit together.

11. The universal cable bracket as in claim 8, wherein each of the sliding clamps has a blade being configured to grip the optic fiber cable.

12. The universal cable bracket as in claim 8, further comprising a receptacle for receiving a sacrament device, the sacrament device being configured to hold the first bracket portion and the second bracket portion together.

13. The universal cable bracket as in claim 8, further comprising a projection being configured for connecting the universal cable bracket to a terminal end cap.

14. The universal cable bracket as in claim 13, wherein the projection depends from a finger extending from proximate the first and second cable receiving areas, the finger having a spring constant urging the projection into connection with the terminal end cap.

15. A method of installing a universal cable bracket about a cable in a fiber management system to strain relieve the cable, the method comprising:

disposing a strength member of an optic fiber cable in a cable receiving area of a first portion to restrain axial movement of the optic fiber cable;

positioning a complementary second portion proximate the first portion;

routing a plurality of fiber tubes of the optic fiber cable through a routing window of one of the first and second portions; and connecting the first portion and the second portion together;

wherein the cable receiving area of the first portion defines a notch, the notch being configured to hold the strength member to prevent axial movement of the optic fiber cable.

16. The method as in claim 15, further comprising disposing a section of the optic fiber cable in the cable receiving area of the first portion and in a complementary cable receiving area of the second portion.

17. The method as in claim 15, further comprising providing each of the first and second portions with respective pins and receptacles and press fitting the respective pins and receptacles together.

18. The method as in claim 15, further comprising sliding clamps through respective slots of the first and second portions, the clamps being configured to contact the optic fiber cable.

19. The method as in claim 18, wherein at least one of the clamps includes a blade being configured to grip the optic fiber cable.

20. The method as in claim 18, further comprising attaching a sacrament device about the first and second portions.

21. The method as in claim 18, wherein the sacrament device is one of a plastic cable tie or a metal clamp.

* * * * *